United States Patent
Bai et al.

(10) Patent No.: US 9,612,127 B2
(45) Date of Patent: Apr. 4, 2017

(54) CARPOOL FINDER ASSISTANCE

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); Leonard C. Nieman, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 14/341,010

(22) Filed: Jul. 25, 2014

(65) Prior Publication Data
US 2016/0025507 A1 Jan. 28, 2016

(51) Int. Cl.
*G01C 21/00* (2006.01)
*G01C 21/34* (2006.01)
*G06Q 10/02* (2012.01)

(52) U.S. Cl.
CPC ......... *G01C 21/3438* (2013.01); *G06Q 10/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,080,019 B1* | 7/2006 | Hurzeler | ............... | G06Q 10/08 705/6 |
| 7,756,633 B2* | 7/2010 | Huang | ................... | B60R 25/00 701/517 |
| 8,825,383 B1* | 9/2014 | Kirmse | ............. | G01C 21/3415 701/426 |
| 8,880,601 B2* | 11/2014 | Boskovic | ............... | G06Q 10/02 709/204 |
| 2003/0190076 A1* | 10/2003 | DeLean | .................. | G06F 21/32 382/209 |
| 2004/0049424 A1* | 3/2004 | Murray | .................. | G06Q 10/04 705/14.14 |
| 2004/0052418 A1* | 3/2004 | DeLean | .................. | G06F 21/32 382/209 |
| 2004/0158483 A1* | 8/2004 | Lecouturier | ........... | G06Q 10/08 705/6 |
| 2004/0267449 A1* | 12/2004 | Adamczyk | ......... | G01C 21/3438 701/410 |
| 2006/0059023 A1* | 3/2006 | Mashinsky | ............ | G06Q 10/02 705/5 |
| 2006/0178949 A1* | 8/2006 | McGrath | ................ | G06Q 30/02 705/26.1 |
| 2006/0276960 A1* | 12/2006 | Adamczyk | ............. | G01C 21/00 701/516 |
| 2007/0276595 A1* | 11/2007 | Lewinson | .......... | G01C 21/3438 701/533 |

(Continued)

*Primary Examiner* — Jonathan L Sample
(74) *Attorney, Agent, or Firm* — Quinn IP Law

(57) ABSTRACT

A method of determining ride share compatibility. Vehicle data acquisition devices are employed to collect user attribute information relating to a travel route and locations traveled by the operator. The attribute information includes regularity data, frequency data, and duration data. A regression analysis is applied by a processor for using the regularity data, the frequency data, and the duration data, for identifying an importance probability of each of the locations visited by the operator. A match is determined between the operator and a potential travel partner traveling to locations in proximity to the locations traveled by the operator.

27 Claims, 3 Drawing Sheets

(56) References Cited

U.S. PATENT DOCUMENTS

| | | | | |
|---|---|---|---|---|
| 2007/0298885 | A1* | 12/2007 | Tran | A63F 13/06 463/37 |
| 2008/0091342 | A1* | 4/2008 | Assael | G08G 1/202 701/533 |
| 2008/0167892 | A1* | 7/2008 | Clark | G06Q 30/06 705/1.1 |
| 2008/0195428 | A1* | 8/2008 | O'Sullivan | G06Q 10/00 705/6 |
| 2008/0270019 | A1* | 10/2008 | Anderson | G01C 21/3438 701/533 |
| 2009/0210276 | A1* | 8/2009 | Krumm | G06Q 10/025 705/7.33 |
| 2009/0248587 | A1* | 10/2009 | Van Buskirk | G06Q 50/188 705/80 |
| 2010/0280884 | A1* | 11/2010 | Levine | G01C 21/3438 705/13 |
| 2011/0125794 | A1* | 5/2011 | Hutschemaekers | G08G 1/202 707/776 |
| 2011/0208551 | A1* | 8/2011 | Johnson | G06Q 10/04 705/5 |
| 2011/0231354 | A1* | 9/2011 | O'Sullivan | G08G 1/0104 706/46 |
| 2011/0246246 | A1* | 10/2011 | Johnson | G06Q 10/02 705/5 |
| 2012/0004961 | A1* | 1/2012 | Flynn | G06Q 30/02 705/14.5 |
| 2012/0265814 | A1* | 10/2012 | Roussis | G06Q 10/10 709/204 |
| 2012/0290652 | A1* | 11/2012 | Boskovic | G06Q 50/30 709/204 |
| 2013/0030645 | A1* | 1/2013 | Divine | B60K 35/00 701/36 |
| 2013/0138591 | A1* | 5/2013 | Ricci | G06F 9/54 706/46 |
| 2013/0226365 | A1* | 8/2013 | Brozovich | G06Q 50/30 701/1 |
| 2013/0268886 | A1* | 10/2013 | Sureshkumar | G06Q 10/025 715/810 |
| 2013/0297551 | A1* | 11/2013 | Smith | G06N 5/02 706/48 |
| 2014/0195281 | A1* | 7/2014 | Stefik | G06Q 10/02 705/5 |
| 2014/0350975 | A1* | 11/2014 | Paperno | G06Q 10/02 705/5 |
| 2015/0063646 | A1* | 3/2015 | Wang | G06K 9/00812 382/104 |

* cited by examiner

| Driving Time | Location | Potential Event? | Confidence |
|---|---|---|---|
| 8am to 9am | (x0,y0) to (x1,y1) | "Home" to "Office"? | 100% |
| 12pm to 12:15pm | (x1,y1) to (x2, y2) | "Office" to "Lunch"? | 95% |
| 12:45pm to 1pm | (x2,y2) to (x1, y1) | "Lunch" to "Office"? | 95% |
| 5pm to 5:30pm | (x1,y1) to (x3, y3) | "Office" to "Grocery"? | 85% |
| 5:30pm to 6:20pm | (x3,y3) to (x0, y0) | "Grocery" to "Home"? | 85% |

CARPOOL FINDER ASSISTANCE

BACKGROUND OF INVENTION

Ride sharing is an act or instance of sharing rides or transportation. When more than one person uses a vehicle in a same instance of time, ride sharing, or better known as carpooling, reduces each person's cost since such costs as such as fuel, maintenance, and tolls are typically split as each person uses their car proportionally or shares the expenses. Moreover, stress of an individual is typically reduced by not having to drive, particularly in congested traffic.

Ridesharing is also viewed as being environmentally conscientious since carpooling eliminates another vehicle that would typically be on the road and reduces carbon emissions, and traffic congestion.

Ridesharing is more popular and efficient for people who work in places with jobs near one another, and also for those who live in close proximity to one another.

Ridesharing is commonly utilized for commuting to work but may be used in other instances as well. Typically, drivers and passengers will often search for other ride sharers through different mediums. After finding an interested party, they contact them to find out information regarding their commutes and other details to see if there is compatibility.

Ridesharing may not always be arranged for the whole length of a commute; however, the important aspect is having it convenient for all ride shares so that it benefits all parties.

Ridesharing can be formed through different mediums such as public websites, closed websites for employees, and carpool agencies. The issue that is always present is finding not only a ridesharing partner that has a similar travel route, but finding a ridesharing partner that is compatible to travel with.

SUMMARY OF INVENTION

An advantage of an embodiment is to autonomously identify compatible carpool/rideshare users based on behavior and mobility metrics. The technique described herein accurately identifies compatible carpool partners by utilizing a location matching approach to accurately derive important user endpoints. Potential rideshare partners are accurately identified by quantifying travel habits in terms of time variance, time difference, and distance similarity. Relevant vehicle data is used to determine similar driving and behavior attributes while leveraging social network connection information to increase partner compatibility.

An embodiment contemplates a method of determining ride share compatibility. Vehicle data acquisition devices are employed to collect user attribute information relating to a travel route and locations traveled by the operator. The attribute information includes regularity data, frequency data, and duration data. A regression analysis is applied by a processor for using the regularity data, the frequency data, and the duration data, for identifying an importance probability of each of the locations visited by the operator. A match is determined between the operator and a potential travel partner traveling to locations in proximity to the locations traveled by the operator.

DETAILED DESCRIPTION

Figures 1, 2:
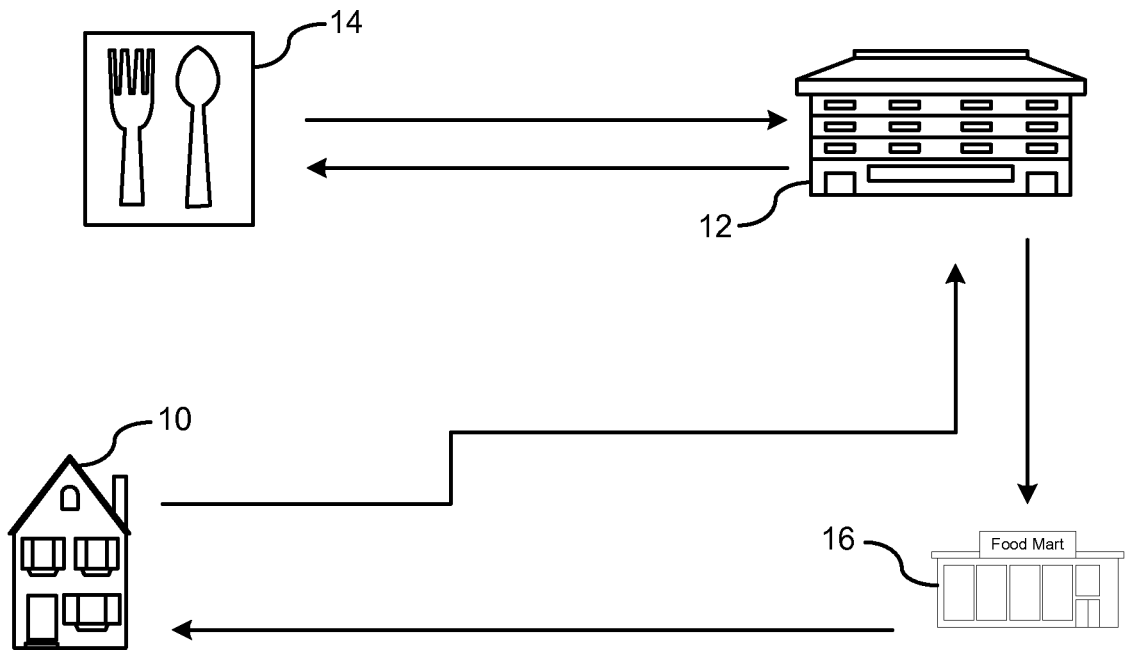
FIG. 1 is an exemplary travel route for a vehicle.
FIG. 2 is an exemplary table of the travel route identifying important locations.

FIG. 1 illustrates an exemplary travel route of typical locations traveled by a user throughout a day. As shown in the exemplary illustrations, a vehicle travels from a home location 10 to an office 12. The vehicle may then travel to an eating location 14 and then back to the office 12. While enroute to the home location 10 the vehicle stops by a store 16 to purchase produce or goods before completing the trip to the home location 10.

FIG. 2 illustrates a table identifying the drive times, locations, potential events that the vehicle is being driven to, and a confidence level as to whether the potential events or location listed is correct. For example, the first leg of the travel route is from 8 am to 9 am. The location is designated by a first (x-y) coordinate to a second (x-y) coordinate. Based on the time and location, the potential event is listed as traveling from the home to the office. The confidence level is shown to be 100% if this route is traveled each weekday at the same time. The second and third legs of the traveled route indicate a round-trip traveled around noon. Based on the coordinates in the time of travel, the potential event is listed as traveling between the office and a lunch location. The $4^{th}$ leg of travel indicates a location somewhere between the office and home and is traveled at a close of business time of day. It is assumed based on the length of time spent at this location that the location pertains to a store. Finally, the $5^{th}$ leg and final leg of the route indicates a travel route between the store and home based on the parked at the same location for the remainder of the night through the early morning hours. As a result of the information collected, a travel route that includes important locations and the amount of time spent at each location (i.e., duration) could be accumulated, analyzed and stored in a user profile.

Figure 3:
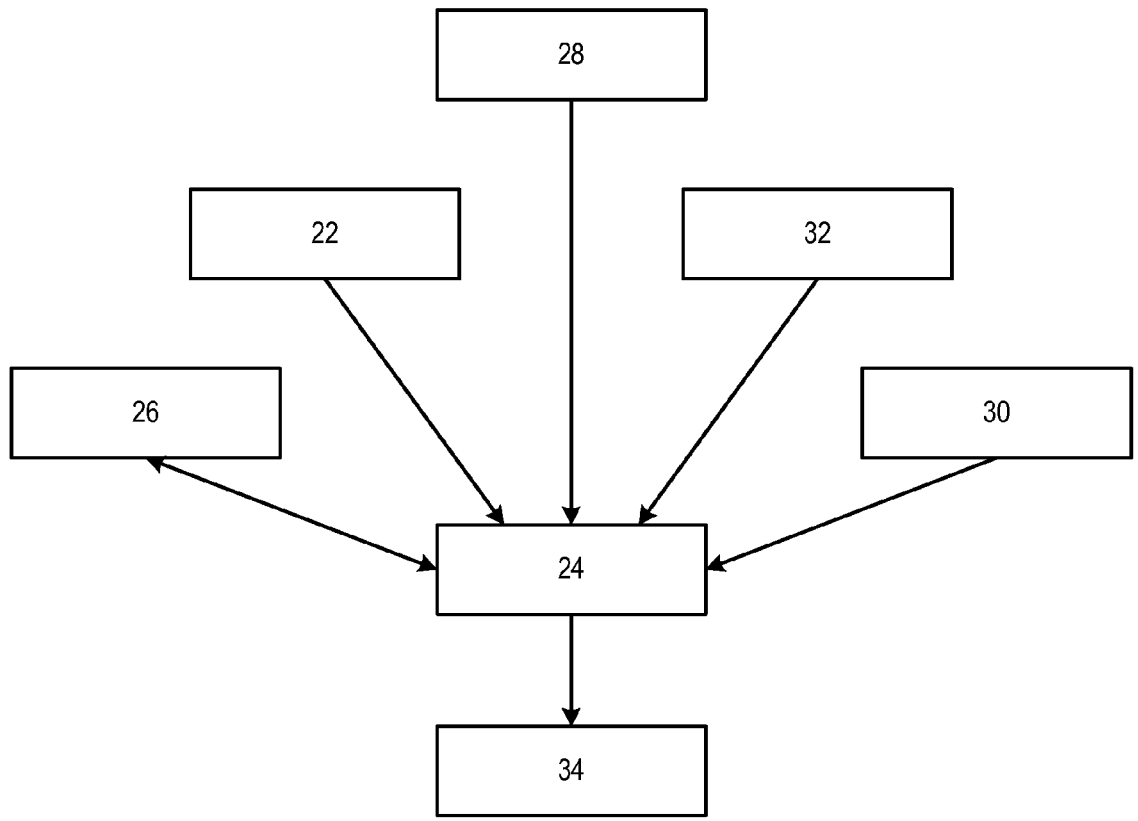
FIG. 3 is a block diagram of a system for identifying potential ridesharing partners.

FIG. 3 illustrates a system 20 for identifying attribute information for the user profile and for determining rideshare compatibility with a potential travel partner. The application intelligently analyzes the mobility trace of vehicles and drivers behaviors to identify compatible partners recommended for ridesharing. The application is preferably a vehicle-based application since it is based on the travel routes of the vehicle. However, a mobile application, such as a smart phone, may be utilized if carried by the user throughout its course of travel.

The system 20 may include one or more vehicle data acquisition devices to collect user attribute information relating to a travel route and locations traveled by the operator. Such attribute information may include GPS devices 22 and/or map data for identifying a location that the user is traveling to and from, a processor 24 for obtaining regularity data, frequency data, and duration data, a memory storage device 26 for storing data. The regularity data relates to the number of days the location is visited over a specific duration of time. The frequency data relates to the number of times the location is visited over the specific duration of time. The duration data relates to how long the location is being visited each time. The duration data may be derived by averaging the length of time over a specific period, such as a week.

The attribute information may further include other devices 28 that sense the driving behaviors of the driver (e.g., aggressive, conservative) and multimedia listening behaviors (e.g., silent, loud music, talk shows). It should be understood that the attribute information identified is only exemplary and that other types of attribute information may be collected.

The system 20 further includes a human machine interface 30 for receiving inputs entered directly by the user. While information may be autonomously obtained, the system 20 may utilize data directly entered by the user.

The system 20 further includes communication devices 32 that allow the user to communicate with social networks that include, but are not limited to Facebook and LinkedIn.

The processor 24 will execute a matching algorithm that utilizes the various devices to identify real-life relationships between the user and a potential rideshare partner. Recommendations are output to the user using an output device 34. The output device 34 may provide recommendations visually or audibly.

The system and routine first identifies important locations traveled to by the user. It should be understood that identifying important locations pertains to each user for its respective course of travel. Important locations may be determined by GPS location, driving time, and travel time. As a user travels along a route, starting locations and destination locations are identified by a mapping device or GPS device. Each location is identified by x-y coordinate. The duration of travel time as well as the distance traveled is identified and stored in the memory storage device 26 or similar for generating the table shown in FIG. 2. Each of the stopping locations is first identified and then important locations are selected using the technique described herein. Certain locations may be ignored in which the vehicle is stopped at irregular locations for minimal periods of time. For example, if the duration of time that a user stops is less than a predetermined period of time (e.g., less than 10 minutes), then the assumption is that the user stopped at locations such as a convenience store (e.g., gas station, coffee, etc.). As a result, such atypical stops may either be ignored or may be eliminated when the system identifies the important locations.

As illustrated in FIGS. 1 and 2, a user starts its route at location ($x_0$, $y_0$) and travels to location ($x_1$, $y_1$) between the hours of 8 am and 9 am during each weekday. The assumption is made that the potential event from the user's home to the user's workplace. A confidence level may be identified with this leg to the route based on the identified locations obtained, the drive time, and the distance traveled. Similarly, the vehicle travels from location ($x_1$, $y_1$) to location ($x_2$, $y_2$) where the user stays for a short duration of time (e.g., one-half hour) and then travels back to location ($x_1$, $y_1$) during the hours of 12 noon to 1 pm. Based on the travel time and the duration spent at location ($x_2$, $y_2$), a determination is made that the potential event is a round-trip to a lunch location. A confidence level may be identified with this respective leg of the route based on the identified locations obtained, the drive time, and the distance traveled. At the time when close of business occurs, the vehicle travels from the location ($x_1$, $y_1$) to the home location ($x_0$, $y_0$) and may have an intermediate stop. Based on the time of travel, the distance traveled, and the coordinates, a determination is made that the user travels from its place of business to its home location with an intermediate stop.

The above identified locations are identified as important based on monitoring the user's course of travel over a respective period of time and applying a location regression analysis routing technique. Each of the visited places shown in the table in FIG. 2 can be indirectly inferred as to whether it is an important location utilizing various metrics. For example, metrics such as regularity data, frequency data, and duration data may be utilized in regression analysis for identifying whether location is important.

Regularity data is defined as the number of days that the respective location is visited over a respective duration of time. For this example, a one week allocated time frame may be utilized as the respective duration of time. It should be understood that a duration of time other than one week may be utilized.

Frequency data is defined as the number of times that this location is being visited over the respective duration of time (e.g., 12 times in a one week).

Duration data is defined as how long this location is visited each time (e.g., 8 hours each weekday). The duration data may be averaged over the course of the respective duration of time.

The probability or importance of the respective (ith) location can be determined utilizing the logistic regression formula as follows:

$$p_i(R_i, F_i, D_i) = \frac{1}{(1 + e^{\alpha_R R_i + \alpha_F F_i + \alpha_D D_i})}$$

where $R_i$ represent regularity data for an $i^{th}$ location, $F_i$ represent regularity data for an $i^{th}$ location, $D_i$ represent regularity data for an $i^{th}$ location, and $\alpha_R$, $\alpha_F$, $\alpha_D$ are calculated using a rich set of training data. As the logistic regression is applied, $\alpha_R$, $\alpha_F$, $\alpha_D$ are used as a prior knowledge. Assumptions can then be determined from the logistic regression analysis. For example, for the vast majority working people, the house location is a place with the highest $p_i$ value when the user is at that location from 8 pm to 6 am during the entire week. Alternatively, work is the location with the highest $p_i$ value from 9 am to 5 pm during the entire week.

Once the important locations are identified, a matching ride sharing partner may be identified. For a pair of potential partners (m and n), the distance difference, time difference, and a time variance can be defined. The distance difference, which is a difference in the distance between the location traveled to by the user and the location traveled to by the potential partner, is represented by the following formula:

$$D(m,n) = d_{home}(m,n) + d_{work}(m,n).$$

The time difference is the difference in time between the location traveled to by the user and the location traveled to by the potential partner and is represented by the following formula:

$$\tau(m,n) = \max(|t_{leave\ H}(m) - t_{leave\ H}(n)|, |t_{leave\ W}(m) - t_{leave\ W}(n)|)$$

The time variance is the variance in time between the location traveled to by the user and the location traveled to by the potential partner and is represented by the following formula:

$$\sigma(m,n) = \max(|\sigma_{leave\ H}(m) - t_{leave\ H}(n)|, |\sigma_{leave\ W}(m) - \sigma_{leave\ W}(n)|).$$

The user can also specify its own maximal tolerance in terms of the three metrics described above. That is, given a user's tolerance for the differential distance, the differential time, and the differential time variance the user can set maximum limits as to what will be acceptable in determining a behavioral match with a potential ride share partner. As a result, given m, ∀n s. t., the following tolerances may be utilized:

$$D(m,n) \leq D_{max}$$

$$\tau(m,n) \leq \tau_{max}$$

$$\sigma(m,n) \leq \sigma_{max}$$

where $D_{max}$, $\tau_{max}$, and $\sigma_{max}$ represent the maximum tolerances set by the user.

In addition to the evaluating behavior matching to identify a potential ride sharing partner, a similarity behavior is evaluated. The vehicle or other device utilizing the application may implicitly build a profile for its user over time while tracking the user's behaviors. Behaviors that may be used to build the profile include, but are not limited to, driving behaviors (e.g., aggressive, conservative) and radio listening behaviors (e.g., silent, loud music, talk show).

Each of the users profile can be quantified as a vector in an n-dimensional space (e.g., John Smith's profile=[0.15, 0, 0, 0, 0.35, 0, 0.3, 0, 0, 0.2). The profile for a user (i) and a user (j) can be quantified as m-dimensional vectors as follows:

$$V_i = [v_i^1, v_i^2, v_i^3 \ldots, v_i^m]$$

$$V_j = [v_j^1, v_j^2, v_j^3 \ldots, v_j^m]$$

the similarity between a pair of vehicle users can then be calculated using the following formula:

$$sim(\vec{V}_i, \vec{V}_j) = \cos(\vec{V}_i, \vec{V}_j) = \frac{\vec{V}_i \otimes \vec{V}_j}{\|\vec{V}_i\| \cdot \|\vec{V}_j\|} \frac{\sum_{k=1}^{m} v_i^k v_j^k}{\sqrt{\sum_{k=1}^{m} (v_i^k)^2} \sqrt{\sum_{k=1}^{m} (v_j^k)^2}}$$

Figure 4:
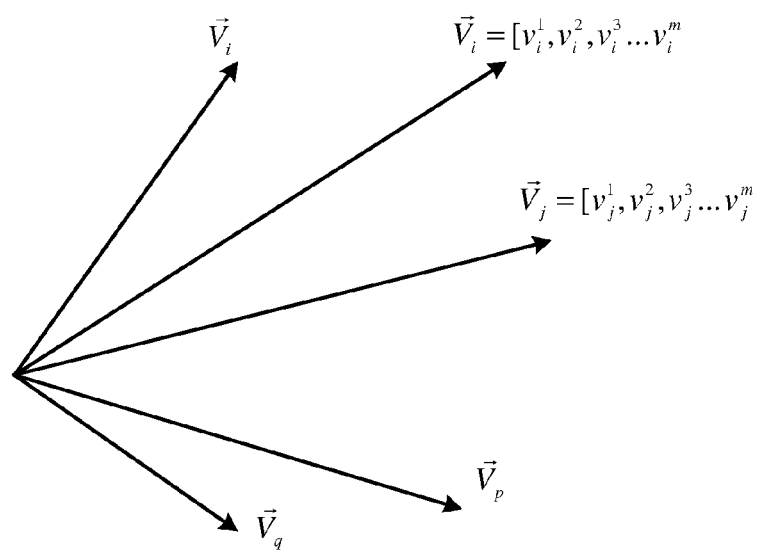
FIG. 4 is an exemplary behavior vector illustration.

FIG. 4 represents a vector diagram represented in m-dimensional space for identifying a potential ridesharing partner.

Prior to applying each of the behavior matching and the behavior similarity to a potential user, a user interest must first be identified. To identify users of interests, various methods such as Internet social networks (e.g., Facebook and LinkedIn) may be utilized where an API of the social network may identify the real-life relationship distance (hops) between the respective peer users. A hop is defined as an intermediate connection in a string of connections linking two users of the application or in a network. Developers of the respective application described herein or the Internet social network could directly measure the relationship distance between two people, without revealing their name to each other. The system could leverage the social network website APIs to gauge the social relationship between a user and the potential ridesharing partner. An objective would be to measure the social relationship between the users, and/or provide a name of a common friend between them as a potential reference, and/or provide a reference to increase a feeling of security for ride sharers. For example, a criteria could be to not share a ride with a stranger, but a person who the user knows in a few hops.

Figure 5:
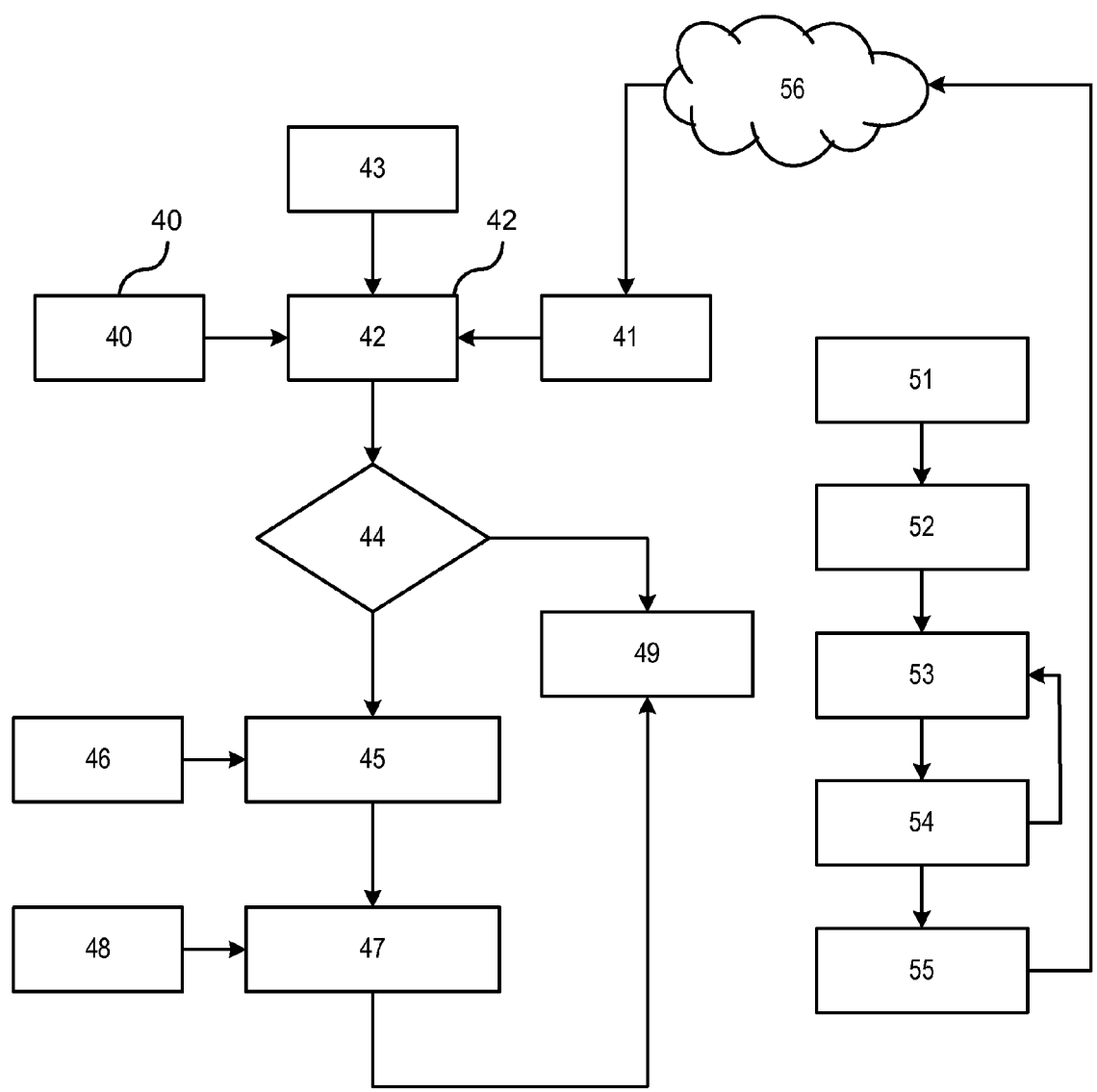
FIG. 5 is a flowchart of an integrated vehicle system for identifying potential ridesharing partners.

FIG. 5 illustrates an integrated vehicle system utilizing the match ridesharing system. In block 40, local trips and local styles in addition to remote trips and remote styles 41 are input to a user matching algorithm 42. User requests 43, which provide specific user tolerances and guidelines, are also input to the user matching algorithm 42. The matching algorithm for matching ride sharers as described herein is applied to the inputs.

In block 44, a determination is made as to whether a social network filter is desired. Social network filter may include selection criteria relating to, but not limited to, age, gender, and ethnicity. If a filter social network is desired, then the routine proceeds to block 45; otherwise, the routine proceeds to block 49.

In block 45, an internal and/or external population filter is applied to the matching algorithm data. Also input to the filter are network preferences represented in block 46.

In block 47, an optional filter based on connection status may be applied to the filter outputs of block 45. Filter requirements may be defined by a user such selecting a potential travel partner based on vehicle similarity. Such criteria can include similar vehicle make, vehicle age, and other vehicle characteristics obtained by a user or by the user entering a vehicle VIN. In addition, inside network preferences as illustrated in block 48 may be input to the optional filter. Such network preferences may include filters based on social connection and connection types such as LinkedIn members, LinkedIn group member, direct connections, indirection connection. The system may look at the number of hops between two people in a social network such as LinkedIn or Facebook. The output from the optional filter is then provided to the recommendations module in block 49.

In block 49, potential ridesharing users based on the matching algorithm as well as the filters applied to the social network search engine is used to identify potential ride share partners based on the matching criteria. The recommendations are output to the user using a human machine interface output device. The human machine interface output device may provide recommendations visually or audibly.

In addition, a Finder system may be applied which analyzes a users driving characteristics which is information data that is additionally utilized for remote trips. In block 51, a Finder application is downloaded from the developer.

In block 52, the user registers and provides opt-in selections.

In block 53, trips are characterized based on their time and variance.

In block 54, the driver style is characterized by monitoring trips traveled in block 53. The routine may loop between block 54 and 53 for characterizing the driving style of the user.

In block 55, the results are published and are stored in a storage device or cloud device 56. The results are then provided as input to the remote trips and remote styles shown in block 43.

While certain embodiments of the present invention have been described in detail, those familiar with the art to which this invention relates will recognize various alternative designs and embodiments for practicing the invention as defined by the following claims.

What is claimed is:

1. A method of determining ride share compatibility, the method comprising the steps of:
    employing vehicle data acquisition devices to collect user attribute information relating to a travel route and locations traveled by an operator, the attribute information including regularity data, frequency data, and duration data;
    storing the user attribute information in a memory storage device;
    applying a regression analysis by a processor using the regularity data, the frequency data, and the duration data, wherein the processor determines an importance probability of each of the locations visited by the operator as a function of regularity data, frequency data, and duration data;

determining a match between the operator and a potential travel partner traveling to locations in proximity to the locations traveled by the operator;

outputting recommendations of the match to the operator using an output device.

2. The method of claim 1 wherein the regularity data includes a number of days a respective location is visited in one week.

3. The method of claim 1 wherein the frequency data includes a number of times that a respective location is visited in one week.

4. The method of claim 1 wherein the duration data includes a length of time that the user stays at a respective location during one visit.

5. The method of claim 4 wherein the duration data for a respective location is an average for a week.

6. The method of claim 1 wherein the importance probability for each location determined by applying regression analysis is represented by the following formula:

$$p_i(R_i, F_i, D_i) = \frac{1}{(1 + e^{\alpha_R R_i + \alpha_F F_i + \alpha_D D_i})}$$

where $R_i$ represent regularity data for an $i^{th}$ location, $F_i$ represent regularity data for an $i^{th}$ location, and $D_i$ represent regularity data for an $i^{th}$ location.

7. The method of claim 6 wherein a respective location having a highest determined importance probability among each of the determined importance probabilities between the hours of 8 pm to 6 am during a weekday is determined to be a home location of the user.

8. The method of claim 6 wherein a respective location having a highest determined importance probability among each of the determined importance probabilities between the hours of 9 am to 5 pm during a weekday is determined to be a work location of the user.

9. The method of claim 1 wherein the vehicle data acquisition devices autonomously collect user attribute information.

10. The method of claim 1 wherein the user manually enters the user attribute information using a machine interface device, the information being stored in the memory storage device.

11. The method of claim 1 wherein employing vehicle data acquisition devices to collect user attribute information includes analyzing mobility trace information of the vehicle to obtain at least one of operator detection information, driving route information, operator driving behavior information, media accessory usage information, and multimedia content usage information.

12. The method of claim 1 wherein determining a match between user and the potential travel partner includes evaluating matching behaviors.

13. The method of claim 12 wherein evaluating matching behaviors includes evaluating a distance difference between the location traveled to by the user and the location traveled to by the potential partner, wherein the distance difference is represented by the formula:

$$D(m,n) = d_{home}(m,n) + d_{work}(m,n).$$

14. The method of claim 13 wherein evaluating matching behaviors includes evaluating a time difference between the location traveled to by the user and the location traveled to by the potential partner, wherein the time difference is represented by the formula:

$$\tau(m,n) = \max(|t_{leave\ H}(m) - t_{leave\ H}(n)|, |t_{leave\ W}(m) - t_{leave\ W}(n)|).$$

15. The method of claim 14 wherein evaluating matching behaviors includes evaluating a time variance between the location traveled to by the user and the location traveled to by the potential partner, wherein the time variance is represented by the formula:

$$\sigma(m,n) = \max(|\sigma_{leave\ H}(m) - t_{leave\ H}(n)|, |\sigma_{leave\ W}(m) - \sigma_{leave\ W}(n)|).$$

16. The method of claim 15 wherein a user selects maximum tolerances relating to the distance difference, time difference, and time variance for identifying a matching potential travel partner.

17. The method of claim 1 wherein evaluating matching behaviors between the user and the potential travel partner utilizes social network information.

18. The method of claim 17 wherein evaluating social network information includes direct connections within a social media group.

19. The method of claim 17 wherein evaluating social network information includes indirect connections within a social media group.

20. The method of claim 17 wherein indirect connections within a social media group utilizes connections within a predetermined number of hops between the user and the potential traveling partner.

21. The method of claim 1 wherein evaluating matching behaviors between the user and the potential travel partner utilizes vehicle similarity information.

22. The method of claim 1 wherein determining a match between user and the potential travel partner includes evaluating behavior similarities between the user and the potential travel partner.

23. The method of claim 22 wherein a user profile is autonomously generated over time as a function of the behaviors of the user.

24. The method of claim 23 wherein the behaviors of the user include driving behaviors.

25. The method of claim 17 wherein the behaviors of the user include radio listening behaviors.

26. The method of claim 17 wherein the behaviors of the user include air conditioning behaviors.

27. The method of claim 17 wherein the similarity between the user and the potential carpool partner is determined by the following formula:

$$sim(\vec{V}_i, \vec{V}_j) = \frac{\sum_{k=1}^{m} v_i^k v_j^k}{\sqrt{\sum_{k=1}^{m} (v_i^k)^2} \sqrt{\sum_{k=1}^{m} (v_j^k)^2}}$$

where the profile for each user is quantified as m-dimensional vectors $(\vec{V}_i, \vec{V}_j)$.

* * * * *